United States Patent [19]
Thompson

[11] Patent Number: 5,219,146
[45] Date of Patent: Jun. 15, 1993

[54] GEAR OPERATED SQUEEZE OFF TOOL

[75] Inventor: Clifford F. Thompson, Bradford, Canada

[73] Assignee: Footage Tools, Ontario, Canada

[21] Appl. No.: 881,087

[22] Filed: May 11, 1992

[51] Int. Cl.⁵ ................... F16K 31/52; F16H 29/20
[52] U.S. Cl. .................... 251/7; 74/89.15; 74/89.14; 74/665 C
[58] Field of Search ............ 251/7, 8, 4; 74/625, 74/89.15, 89.14, 665 C

[56] References Cited

U.S. PATENT DOCUMENTS

| | | | |
|---|---|---|---|
| 4,022,309 | 5/1977 | Denkowski et al. | 74/625 X |
| 4,114,474 | 9/1978 | Stratienko | 74/625 |
| 4,715,241 | 12/1987 | Lipinski et al. | 74/89.15 |
| 5,042,757 | 8/1991 | Jenkins et al. | 251/7 X |

Primary Examiner—Martin P. Schwadron
Assistant Examiner—Kevin L. Lee
Attorney, Agent, or Firm—Shoemaker and Mattare, Ltd.

[57] ABSTRACT

A squeeze off tool for a flexible pipe includes a vice arrangement involving a first member below the pipe and a second member above the pipe, with a framework guiding the second member for movement toward and away from the first. A power screw has one end rotatably mounted in the second member but cannot move axially with respect to the second member, the power screw having external threads at a location remote from the one end. A locking device selectively restrains rotation of the power screw with respect to the second member. A mechanical advancement mechanism mounted on the framework includes (a) a component defining an internal engaging an external thread on the power screw so that rotation of the power screw when the component is stationary moves the power screw axially, and (b) a worm gear mechanism is provided for rotating the component with respect to the framework, so that rotation of the component when the power screw is restrained against rotation will also move the power screw axially with respect to the component.

17 Claims, 8 Drawing Sheets

GEAR OPERATED SQUEEZE OFF TOOL

This invention relates generally to gear-operated squeeze off tools of the kind widely used in the natural gas distribution industry to control the flow of natural gas in polyethylene mains by pinching the pipe in order to stop the flow of natural gas inside the pipe.

BACKGROUND OF THIS INVENTION

The use of flexible polyethylene piping in the natural gas distribution industry has offered the considerable advantage of reducing the number of valves that must be utilized in a given distribution system. In order to stop the flow of natural gas within such a pipe, the pipe is simply squeezed until its walls are collapsed against each other, thereby cutting off any flow within the pipe. Polyethylene has the capability of withstanding this kind of distortion without rupture. However, when attempting to squeeze off polyethylene piping having a diameter of 4 inches or larger, a great deal of force is required to completely close the pipe. When the pipe is cold, the required force is even greater.

The primary conventional method of performing the squeeze off operation larger diameter pipe utilizes a hydraulic cylinder and hand pump to achieve the required squeezing force. This normally requires the operator to use an expensive hydraulic system operating at high pressure (generally 10,000 psi). It would be of considerable benefit to allow large diameter pipe to be squeezed off utilizing a mechanical apparatus operated with standard equipment such as a ratchet wrench.

GENERAL DESCRIPTION OF THIS INVENTION

In view of the foregoing, it is an object of one aspect of this invention to provide a mechanical squeeze off tool for flexible polyethylene pipe, which is capable of generating high squeezing force while not requiring great exertion on the part of the operator.

Accordingly, this invention provides a squeeze off tool for restricting fluid flow through a flexible pipe, the tool comprising:

vise means which includes a first member adapted to be located underneath the pipe and a second member adapted to be located above the pipe, framework means operatively associated with said vise means, the framework means guiding the second member for movement toward and away from the first member, elongate power screw means defining an axis and having one end rotatably mounted to said second member while being restrained against axial movement with respect to said second member, and having external threads remote from said one end, lock means for selectively restraining rotation of said power screw means with respect to the second member, and mechanical advancement means mounted on said framework means and being operatively associated with said power screw means, the mechanical advancement means including:

a) a sleeve member defining an internal thread engaging said external thread on said power screw means, the sleeve member being mounted for rotation with respect to the framework means but being restrained against axial movement with respect to said framework means, b) a worm gear mechanism including a worm gear adapted to rotate with said sleeve member and a worm engaging the worm gear, the worm being mounted on a worm shaft for rotation with respect to the framework means but being restrained against axial movement with respect to the framework means, and c) retaining means for selectively preventing rotation of the sleeve member with respect to the framework means, whereby rotation of the power screw means, while the sleeve member is prevented by said retaining means from rotating with respect to the framework means, moves the power screw means axially with respect to said sleeve means; and whereby rotation of the sleeve member, when the power screw means is restrained by said lock means against rotation with respect to the second member, also moves the power screw means axially with respect to said component.

Further, this invention provides a method for squeezing off a flexible pipe, thereby restricting fluid flow through the pipe, the method comprising the steps:

a) providing a squeeze off tool which includes:

vise means which includes a first member adapted to be located underneath the pipe and a second member adapted to be located above the pipe, framework means operatively associated with said vise means, the framework means guiding the second member for movement toward and away from the first member, elongate power screw means defining an axis and having one end rotatably mounted to said second member while being restrained against axial movement with respect to said second member, and having external threads remote from said one end, lock means for selectively restraining rotation of said power screw means with respect to the second member, and mechanical advancement means mounted on said framework means and being operatively associated with said power screw means, the mechanical advancement means including:

i) a sleeve member defining an internal thread engaging said external thread on said power screw means, the sleeve member being mounted for rotation with respect to the framework means but being restrained against axial movement with respect to said framework means, ii) a worm gear mechanism including a worm gear adapted to rotate with said sleeve member and a worm engaging the worm gear, the worm being mounted on a worm shaft for rotation with respect to the framework means but being restrained against axial movement with respect to the framework means, and iii) retaining means for selectively preventing rotation of the sleeve member with respect to the framework means, whereby rotation of the power screw means, while the sleeve member is prevented by said retaining means from rotating with respect to the framework means, moves the power screw means axially with respect to said sleeve means; and whereby rotation of the sleeve member, when the power screw means is restrained by said lock means against rotation with respect to the second member, also moves the power screw means axially with respect to said component, b) positioning the squeeze off tool with the first member below the pipe and the second member above the pipe, c) using the retaining means to keep said sleeve member stationary while rotating the power screw means, in order to advance the second member toward the first member and thereby initiate the squeezing off of said flexible pipe, d) using said worm gear mechanism to rotate said component while using said lock means to restrain the power screw means from rotating with respect to the second member, in order to continue to advance the second member toward the first member and thereby complete the squeezing off of said flexible pipe.

GENERAL DESCRIPTION OF THE DRAWINGS

Several embodiments of this invention are illustrated in the accompanying drawings, in which like numerals denote like parts throughout the several views, and in which.

DETAILED DESCRIPTION OF THE DRAWINGS

Figure 1:
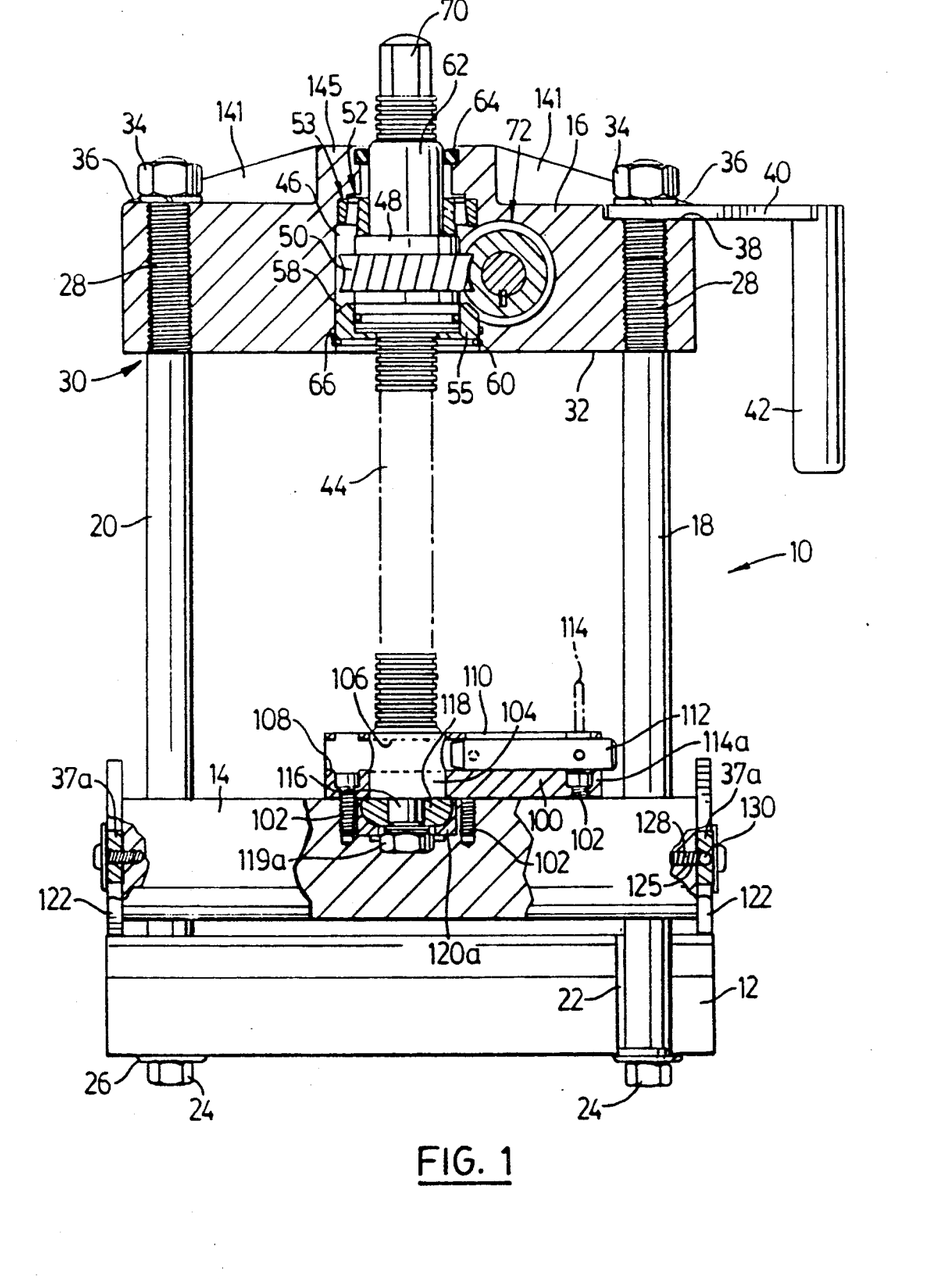
FIG. 1 is a vertical sectional view through a first embodiment of an apparatus constructed in accordance with this invention.
Figures 2, 3:
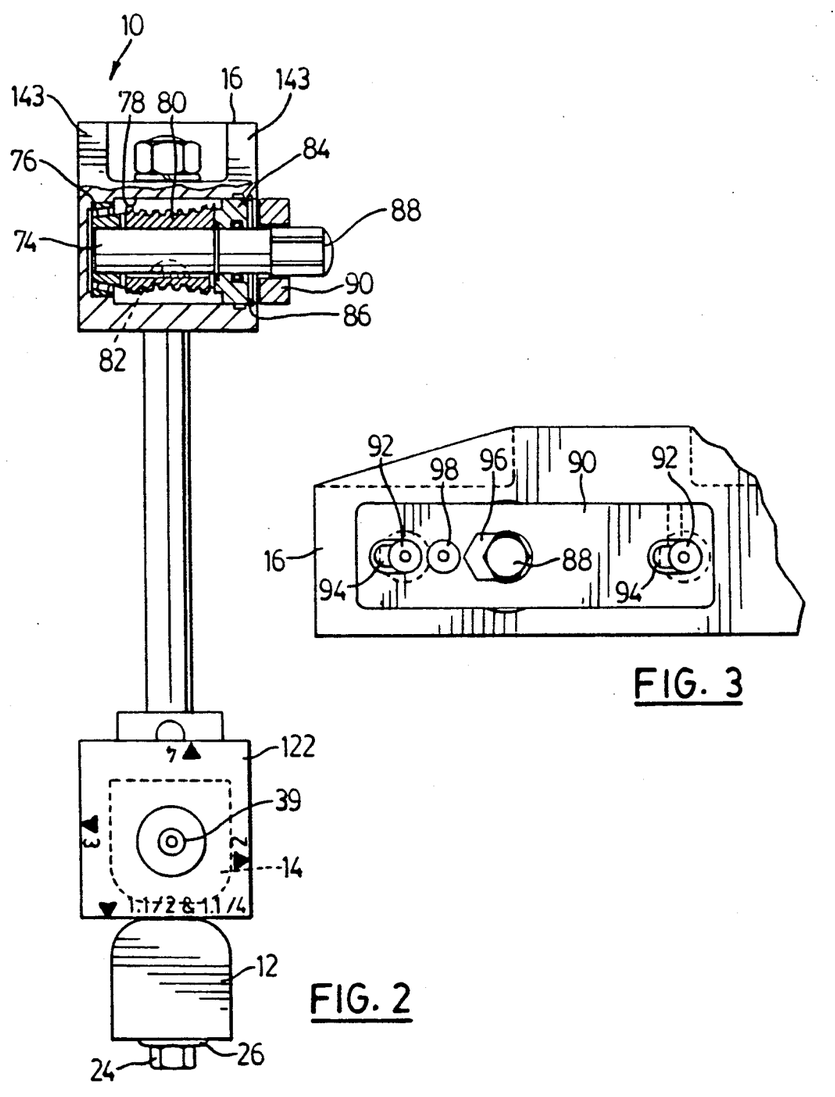
FIG. 2 is a part elevation and part sectional view of the apparatus of FIG. 1.
FIG. 3 is a partial elevational view of the apparatus of FIG. 2, looking along the arrow "A"

Looking first at FIGS. 1, 2 and 3, a gear-operated squeeze off tool shown generally at 10 includes the following major components. A first bar member 12 is located at the lower end of the apparatus, and a second bar member 14 is located above the bar member 12. Preferably, the bar members 12 and 14 are machined from solid aluminum. Using the parlance of the trade, the first bar member 12 is usually referred to as the stationary bar, while the second bar member 14 is referred to as the sliding bar. The apparatus further includes a top bar 16 which serves several functions. The first function is to support in rigid, spaced-apart, parallel relation, two guide shafts 18 and 20. The second bar member 14 is provided with parallel bores adapted to slidingly receive the guide shafts 18 and 20, so that the second bar member (sliding bar) can move along the guide shafts 18 and 20 toward and away from the first bar member 12. The latter also has parallel bores for receiving the guide shafts 18 and 20, however the bore shown on the right in FIG. 1 communicates with a lateral recess 22 which allows the first bar member 12 to be disengaged from the guide shaft 18, in order to allow the assembly to be mounted with respect to a polyethylene pipe, so that the pipe lies between the first and second bar members 12 and 14, and between the guide shafts 18 and 20.

It is to be understood that the first bar member 12 is free to slide along the guide shafts 18 and 20, in the same manner as the second bar member 14, although when in operation the first bar member 12 is always at its lowermost position. This position is established by the presence of hex head cap screws 24 which are screwed into tapped axial bores within the bottom ends of the guide shafts 18 and 20. Also provided for each cap screw 24 is a washer 26 which is adapted to fit within a counterbore in the first bar member. When the washer 26 of the rightward cap screw 24 in FIG. 1 is lodged in the counterbore, it is not possible for the first bar member 12 to be swung out of engagement with the guide shaft 18. In order to break the engagement, the first bar member 12 must first be raised upwardly in order to clear the washer 26 from the counterbore.

Attention is now directed to the top bar 16 in FIG. 1. It will be noted firstly that both of the guide shafts 18 and 20 have a reduced diameter portion 28 adjacent the top end, thus defining a shoulder 30 which abuts a flat bottom surface 32 of the top bar 16. This effectively establishes the position of each guide shaft 18, 20 with respect to the top bar 16. At the upper end of the reduced diameter portion 28 of each of the guide shafts 18 and 20, the shaft is threaded and thus enabled to receive a hex nut 34 which is screwed on to the shaft after a lockwasher 36 is first put into place.

At upper right in FIG. 1, the top bar 16 has a groove 38 into which a flat bar 40 can be received, the flat bar 40 supporting a vertically disposed handle 42 by which the entire apparatus may be picked up. The flat bar 40 has an aperture which receives the reduced diameter portion 28 of the rightward guide shaft 18, and the tightening of the rightward hex nut 34 effectively secures the handle 42 rigidly with respect to the top bar 16.

The component which positively moves the second bar member 14 vertically along the guide shaft 18 and 20, and thus toward or away from the first bar member 12, is a power screw 44 which has, throughout most of its length, an external acme thread. That acme thread on the power screw 44 engages a component shown generally at the arrow 46 in FIG. 1, this being essentially a cylindrical sleeve 48 which integrally supports a worm gear 50. The cylindrical sleeve 48 is mounted for rotation with respect to the top bar 16 by virtue of an upper end conical bearing which includes a bearing cup 53 and a bearing cone 52. This combination provides a thrust bearing which allows the power screw 44 to be forced downwardly with respect to the top bar 16, while preventing upward movement of the component 46 (with its worm gear 50).

No great pressure is ever exerted downwardly on the cylindrical sleeve 48 with respect to the top bar 16, and therefore all that is required is a means for keeping the cylindrical sleeve 48 centred about its axis of rotation. This is accomplished in FIG. 1 by the provision of a bushing 55 which fits snugly within a bore 58, and is held in place by a retaining ring 60. The bore 58 continues with a constant diameter to a location just above the bearing cup 53, where it undergoes a transition to a smaller diameter for the remainder of the distance to the top of the top bar 16. The component 46 further includes a cylindrical collar 62 which continues the engagement with the external acme threads of the power screw 44. An oil seal 64 is provided around the top of the collar 62. At the location of the bushing 55, an O-ring seal 66 is provided.

It will now be realized that the power screw 44 can be made to advance downwardly with respect to the top bar 16 in either of two ways: firstly, the cylindrical sleeve 48 and its integral worm gear 50 can be held stationary, while the power screw 44 is rotated, so that it advances in the manner of a typical screw; secondly, the power screw 44 can be restrained against rotation (by means to be described below), while the cylindrical sleeve 48 and integral worm gear 50 are rotated.

To advance the power screw 44 in the first of these two ways, the upper end of the power screw 44 is provided with a hexagonal configuration 70, and a typical wrench of the ratchet type can be fitted over the hexagonal configuration 70, and used to rotate the power screw 44. In the second of the two ways of advancing the power screw 44, the worm gear 50 is rotated by a conventional worm shown schematically in FIG. 1 by the structure 72, and shown in greater detail at the top of FIG. 2. The elevation of FIG. 2 is taken looking in a direction at right angles to that of FIG. 1. In FIG. 2, there is seen a worm shaft 74 which is received at its leftward end in a conventional thrust bearing 76 which is lodged in a suitable recess 78 within the top bar 16.

The worm shaft 74 is keyed to a worm 80 by a key 82 which is received in matching slots in the shaft 74 and a worm 80. The shaft assembly further includes an annular member 84 having a central opening through which the worm shaft 74 is received, the annular member 84 being held in place within the recess 78 by a retaining ring 86, this being a well known construction. Various O-ring seals are provided, as clearly seen in FIG. 2, in order to retain lubricating oil in the recess 78.

It will be noted that the worm shaft 74 has, at its rightward end, a hexagonally faceted portion 88, as clearly seen in FIG. 2. Also seen in FIG. 2, in cross-section, is a slide plate 90, which is seen in full elevation in FIG. 3. The slide plate 90 is supported on the top bar 16 for limited lateral sliding movement with respect thereto, by virtue of two mounting screws 92 which pass through laterally elongated slots 94 in the slide plate 90 and engage tapped bores in the top bar 16. The slide plate 90 also exhibits a control slot 96 and engage tapped bores in the top bar 16. The slide plate 90 also exhibits a control slot 96 through which the faceted portion 88 of the worm shaft 74 extends. The slot 96 has a hexagonal configuration at the leftward end, which snugly receives the hexagonally faceted portion 88 when it is slid thereover, restraining the worm shaft 74 from rotation. At its rightward end, the slot 96 has a part circular configuration which is large enough to allow the hexagonally faceted portion 88 of the worm shaft 74 to rotate. In effect, the slot 96 has a smaller width at the left end (this being the vertical distance between opposite facets of the slot), and a greater width at the rightward end (this being the diameter of the part circular portion).

The slide plate 90 is snugly but slidably retained in position by the screws 92. The slide plate 90 is also equipped with a handle 98 in a form of a shaft having a threaded extension at one end, the threaded extension being screwed tightly into the slide plate 90.

It will thus be understood that the slide plate 90 constitutes a means for selectively clamping the worm shaft 74 tightly to restrain it against rotation, or releasing the worm shaft 74 for rotation.

Figure 10:
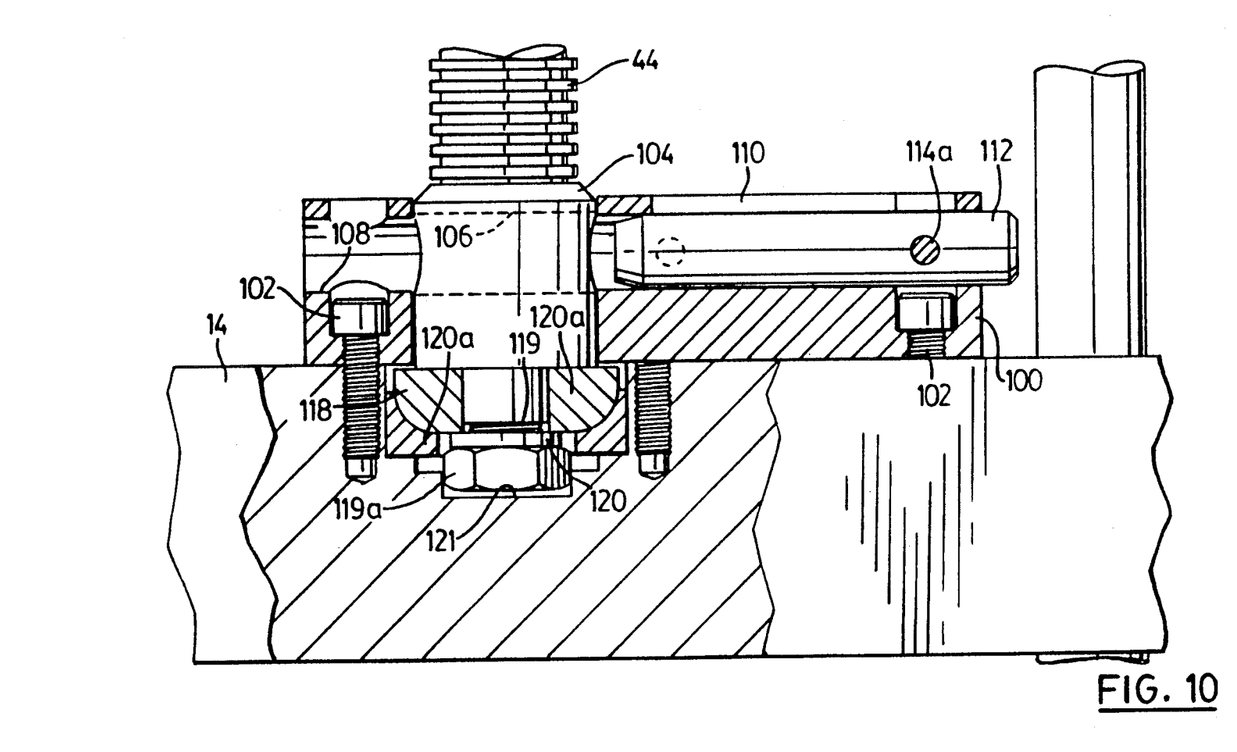
FIG. 10 is an enlarged view of a portion of FIG. 1.

A similar selective clamping or release is required for the power screw 44, and in this connection attention is directed to FIG. 10 and the lower portion of FIG. 1.

In order to lock the power screw 44 against rotation there is provided a retainer 100 in the form of a block secured to the top of the second bar member 14 by virtue of threaded fasteners 102. The retainer 100 has a vertical bore through which an enlarged portion 104 of the power screw 44 snugly but rotatably passes. The enlarged portion 104 has a lateral, diametral bore 106 which can be brought into alignment with a through bore 108 in the retainer 100. The bore 108 is in communication with the top of the retainer 100 through an elongated slot 110 parallel with the bore 108.

A sliding lock pin 112 is inserted into the bore 108, and has a taper at either end for ease of insertion. The lock pin 112 is snugly but slidably received in the bore 108, and threadably receives a roll pin (shown in broken lines at 114 in FIG. 1), by which the operator can slide the lock pin 112 within the bore 108. The roll pin 114 is used not only to move the lock pin axially, but to secure the lock pin in a desired axial position by being rotated through 90° so that it (the roll pin 114) can sit in one of two transverse grooves machined in the retainer 100. A first such groove is provided to allow the lock pin to be maintained out of contact with the power screw 44 (i.e., in the position shown in solid lines in FIG. 1). A second groove, leftwardly of the first groove, is provided to allow the lock pin 112 to be secured in a position in which the lock pin 112 passes through the bore 106 of the power screw 44. The numeral 114a designates the position of the roll pin 114 when it is seen along its own axis, i.e. projecting at right angles to the plane of the drawing paper.

As seen in FIGS. 1 and 10, the power screw 44 has, at its lower end, a cylindrical axial extension 116 which is a press fit in a part 118 of a thrust bearing and has a short axial extension 119 (see FIG. 10) threaded to accept a nut 119a. The nut 119a bears against the part 118 through an anti-reverse washer 120, the latter lying within a recess 120b in an annular support 120a, constituting the other part of the thrust bearing. The thrust bearing parts 118 and 120a transmit the axial downward force exerted by the power screw 44 on the second bar 14. As minimal pressure is required to return the second bar 14 to the top of the frame, upward motion is achieved by thrust bearing 118 engaging the bottom face of the retainer 100. A stepped recess 121 shown directly below the screw 44 and in the second bar 14 provides a space to receive the nut 119a which rotates with the power screw 44.

A special feature of this invention relates to gauge plates which are used to stop the advancement of the second bar member 14 toward the first bar member 12, at a position which leaves a minimum gap between the bars. The gap is selected such that it effectively stops the passage of gas in the pipe, while preventing the pipe from being damaged. Minimum gap dimensions generally follow recommendations made by the manufacturers of the polyethylene pipe.

Attention is directed to FIGS. 1 and 2, which illustrate the provision, at either end of the second bar member 14 of a gauge plate 122. The second bar member is machined to exhibit, at either end, a cylindrical boss 37a which adapted to be received snugly but slidably within an appropriately sized bore through the respective gauge plate 122, thus allowing the gauge plate to be mounted rotatably with respect to the second bar member 14. FIG. 2 particularly shows that the gauge plate 122, although square in its general configuration, has its centre of mounting (centre of rotation) located off-centre, so that the centre of rotation is located at different distances from the four edges of the plate 122. As an example, the closest edge may be 1½ inches from the centre of rotation, the next closest 2 inches, the next closest 3 inches and the furthest 4 inches.

Each end of the second bar member 14 has a hole drilled outside of the boss 37a (the hole being shown at 125 in FIG. 1), each hole housing a compression coil spring 128 and a steel ball 130. The spring 128 urges the ball 130 outwardly against the respective gauge plate 122, the latter having small indents machined on the inside face, in which the ball 130 can lodge. Thus, the operator can set the gauge plate to a desired position, and the spring urged ball 130 will retain the gauge plate 122 in the set position until force is used to rotate it to a different position.

Figures 5, 6:
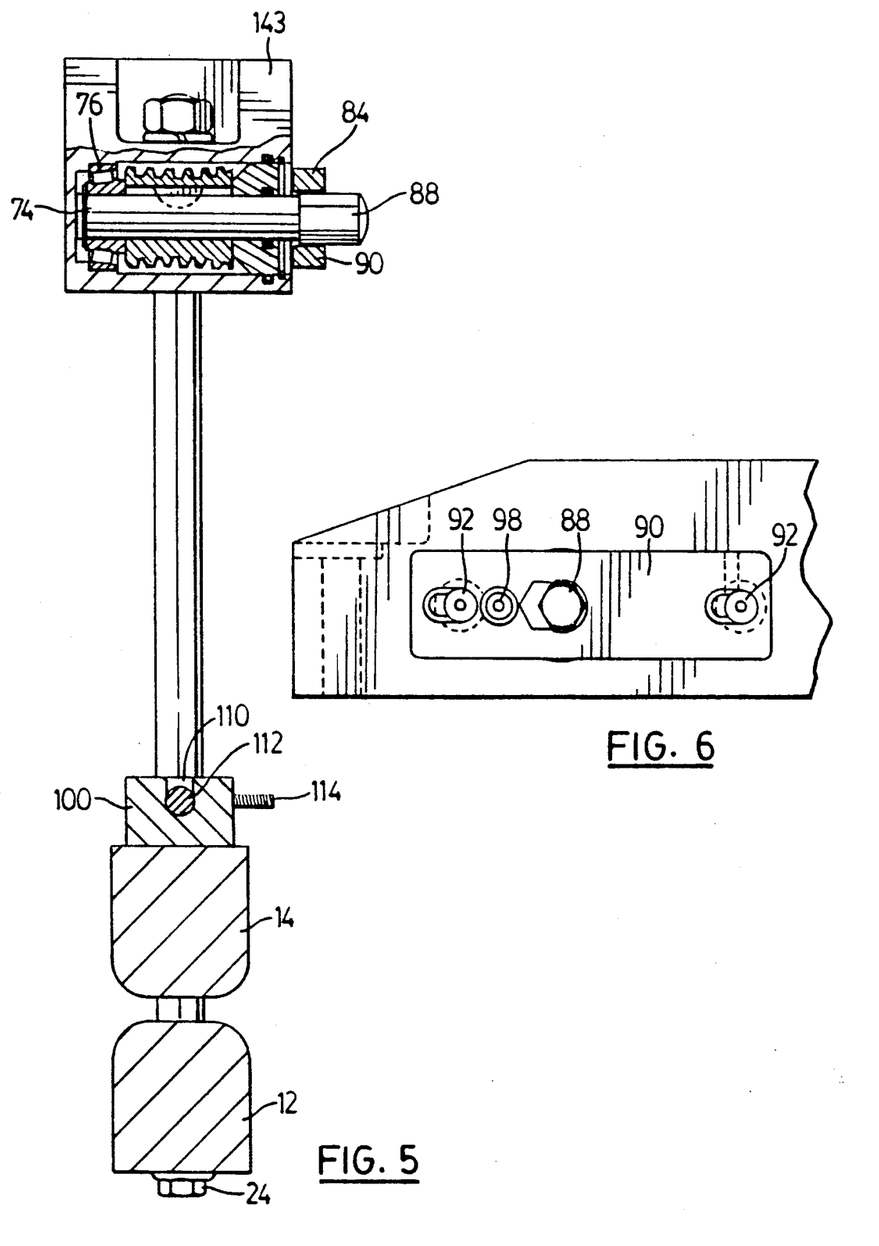
FIG. 5 is a sectional view taken along the line 5—5 in FIG. 4.
FIG. 6 is a partial elevational view taken along the arrow "A" in FIG. 5.

In a preferred form of the invention, the guide shafts 18 and 20 are chrome plated, and the first and second bar members 12 and 14 have a uniform cross-section as illustrated in FIG. 5.

Although the slide plate 90 has been shown as part of a preferred embodiment, having the purpose of selectively locking the worm shaft 74 against rotation), it is considered that, in certain constructions, the slide plate 90 could be eliminated due to the fact that, in many worm gear constructions, frictional forces are high enough to prevent torsion on the worm gear from rotating the worm shaft.

In use, it may be assumed that the polyethylene pipe to be squeezed off is fully exposed through excavation, etc., and that there is sufficient room around the pipe to be able to install the squeeze off tool 10 shown in the drawings. The first step is to position the squeeze off tool with the first bar member 12 below the polyethylene pipe, the second bar member 14 above the polyethylene pipe, and the guide shafts 18 and 20 on either side of the polyethylene pipe. To do this, the first bar member 12 must be disengaged from the rightward guide shaft 18 by raising it slightly upwardly along the guide shafts, and then swiveling the first bar member 12 about the axis of the leftward guide shaft 20, so that the guide shaft 18 is removed from engagement with the first bar member through the recess 22. The bar members 12 and 14 are of course separated at this time, and once the pipe has been placed between the guide shafts 18, 20 with the first bar member generally below the pipe and the second bar member above the pipe, the first bar member 12 can be rotated back into engagement with the guide shaft 18.

The next step is to ensure firstly that the locking pin 112 is out of engagement with the bore 106 in the power screw 44, and that (if necessary) the slide plate 90 is moved to the position in which it prevents rotation of the worm shaft 74. This arrangement ensures that the component 46 will remain stationary with respect to the top bar 16.

Figure 9:
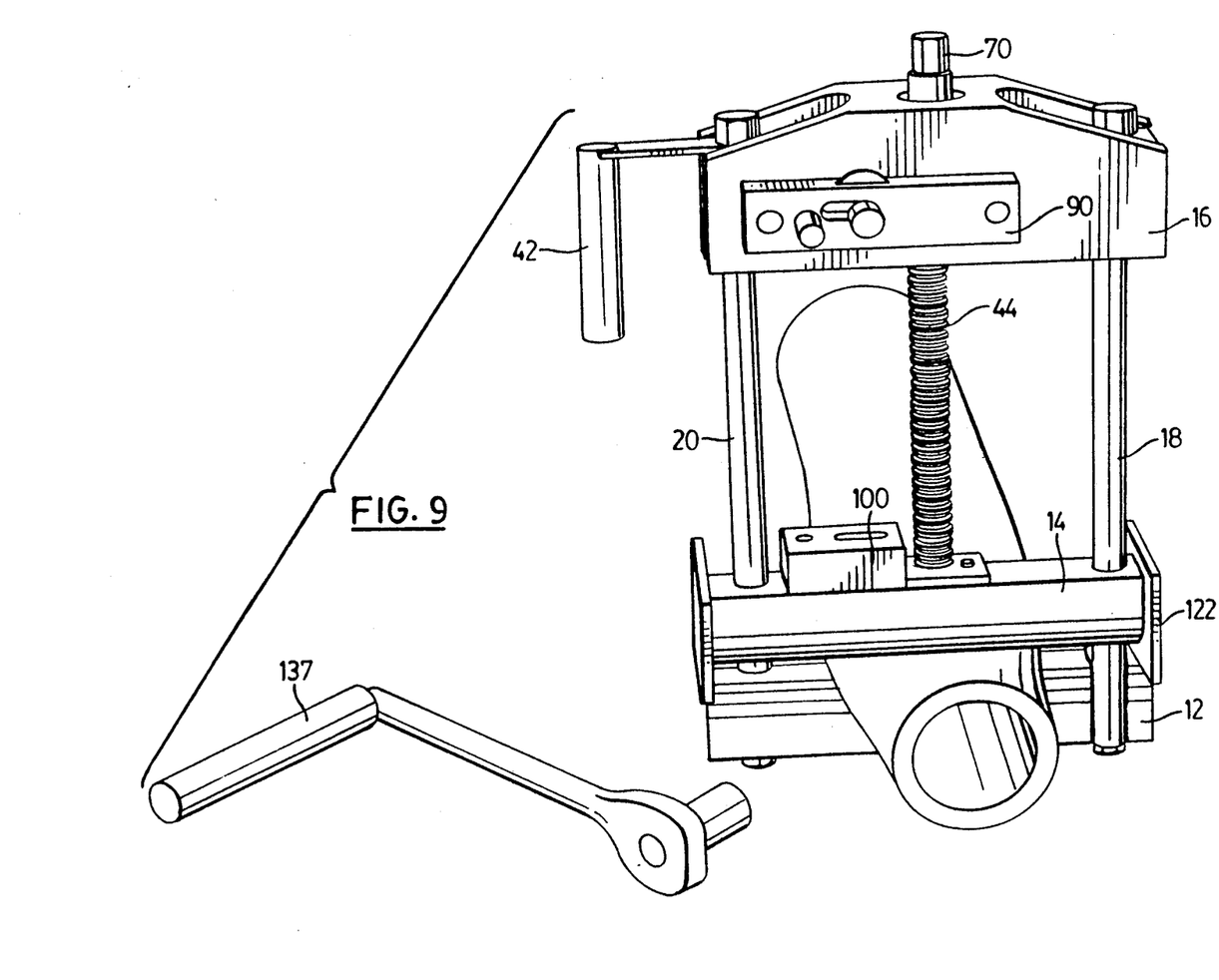
FIG. 9 is a perspective view of the squeeze off tool provided herein, showing how a piece of polyethylene pipe is squeezed by the tool.

The power screw 44 is then rotated by using a suitable hand tool, such as a ratchet wrench of the kind shown at 137 in FIG. 9. Since the component 46 (supporting the worm gear 50) remains stationary at this time, rotation of the power screw 44 will advance the power screw in the downward direction, thus pushing the second bar member 14 downwardly toward the first bar member 12, and initiating the squeezing off of the flexible pipe.

As the pipe is being squeezed through rotation of the power screw 44, it will become increasingly difficult to rotate the power screw, as a result of resistance forces in the pipe. Eventually, particularly when large diameter polyethylene pipe is being squeezed, the required force to pinch the pipe becomes so large that it is almost impossible for an operator to complete the pipe squeeze operation by continued rotation of the power screw 44. It thus becomes necessary to increase the mechanical advantage in such a way that the operator can complete the squeeze off of the pipe. This is done by halting rotation of the power screw 44, releasing the worm shaft 74 by moving the slide plate 90 to its other extreme position (allowing rotation of the faceted portion 88), and restraining the power screw means from rotating with respect to the top bar 16. The latter is accomplished by first rotating the power screw 44 until the bore 106 becomes aligned with the bore 108 in the retainer 100. Then, the locking pin 112 is inserted through the bore 108 and the power screw 44, utilizing the roll pin 114 in its upwardly projecting position (so that it can slide within the recess 110). It will be seen from FIG. 1 that the locking pin 112 can pass fully through the bore 108, and still project rightwardly into the retainer 100. At this position, the roll pin 114 is rotated through 90° to lie in one of the transverse grooves provided for the purpose in the retainer 100.

Next, the worm shaft 74 is rotated by engaging the faceted rightward end portion 88 of the worm shaft 74 with a suitable hand tool, such as a ratchet wrench of the kind shown at 137 in FIG. 9. Rotation of the worm shaft 74 will cause rotation of the worm gear 50 at a much slower rate of rotation, and the engagement of the acme thread on the inside of the component 46 with the acme thread on the outside of the power screw 44 (with the power screw 44 restrained against rotation by the insertion of the locking pin 112) will cause the power screw 44 to continue its downward motion under a considerably greater mechanical advantage. The difference in the mechanical advantage provided by the second method of advancement with respect to the first method of advancement should be at least four times, and preferably five times.

The second mode of advancement of the power screw 44 (utilizing the worm shaft 74) is continued until the gauge plates 112 contact the first bar member 12, thus establishing the minimum spacing permissible between the first and second bar members 12 and 14.

It will be noted in FIGS. 1 and 2 that the top bar 16 has two wedge-shaped recesses 141, each lying between two flanges 143 which strengthen and support a central, upstanding region 145 of the top bar 16.

It will be understood that the sectional configuration of the first and second bar members 12 and 14 does not have to be that shown in cross-section in FIG. 5. For example, a circular section would provide a workable arrangement, although this would call for additional machining in order to mount the retainer 100 securely to the top of the second bar member 14.

Figure 4:
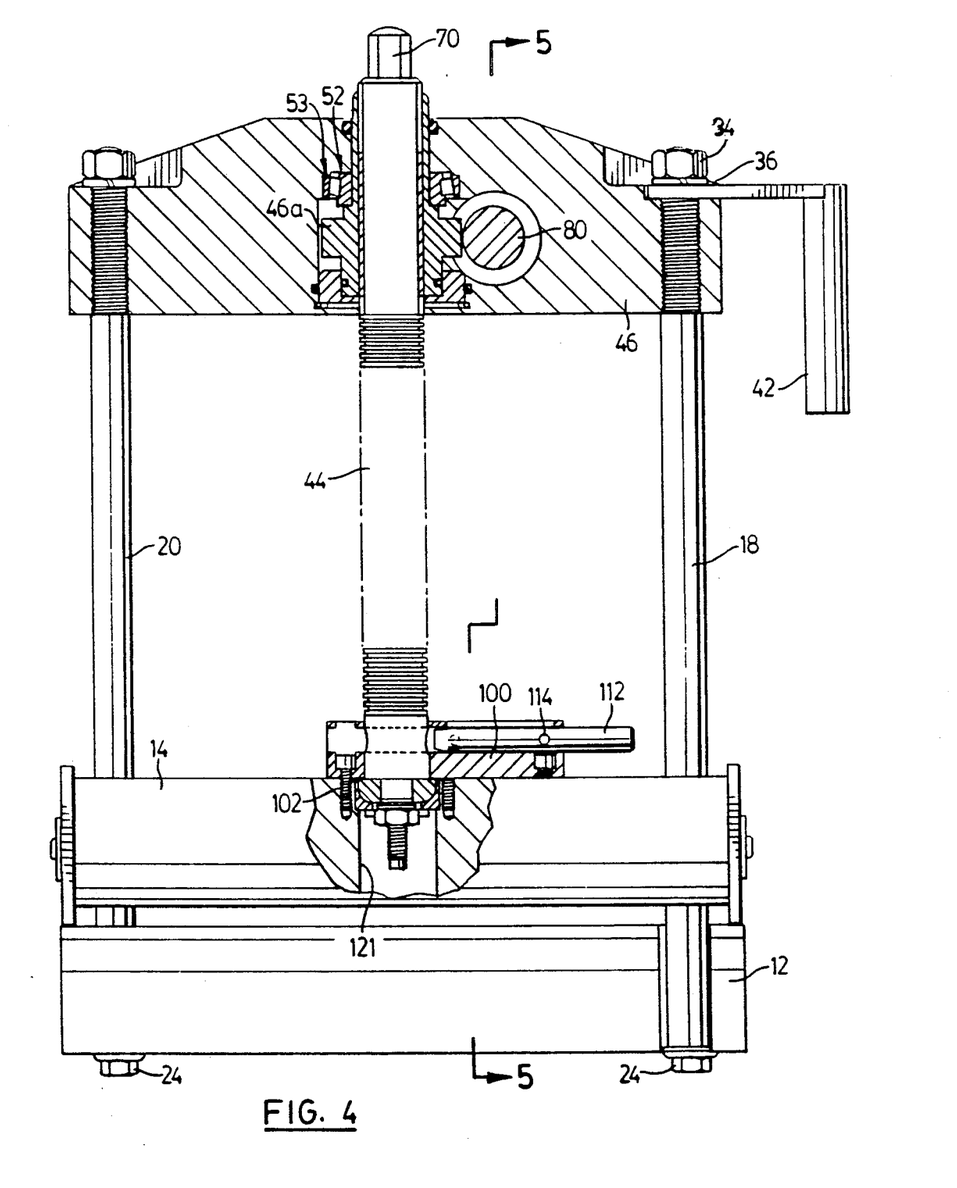
FIG. 4 is a part elevation and part vertical sectional view through an apparatus constructed in accordance with a second embodiment of this invention.

The embodiment shown in FIGS. 4, 5 and 6 differs slightly from the embodiment shown in FIGS. 1, 2 and 3, the difference being primarily that the distance between the guide shafts 18 and 20 is greater, thus allowing a larger size of pipe to be squeezed off. The operation of the embodiment shown in FIG. 4, 5 and 6 is identical to that already described with respect to the embodiment illustrated in FIGS. 1-3, and does not need to be repeated.

It is to be noted, however, that the sectional drawing of the top bar 16 in FIG. 4 cuts through all radially symmetrical members (including the component 46a).

The use of reference numerals in the embodiment shown in FIGS. 4-6 has been minimized, in order to avoid cluttering the drawing.

Figure 7:
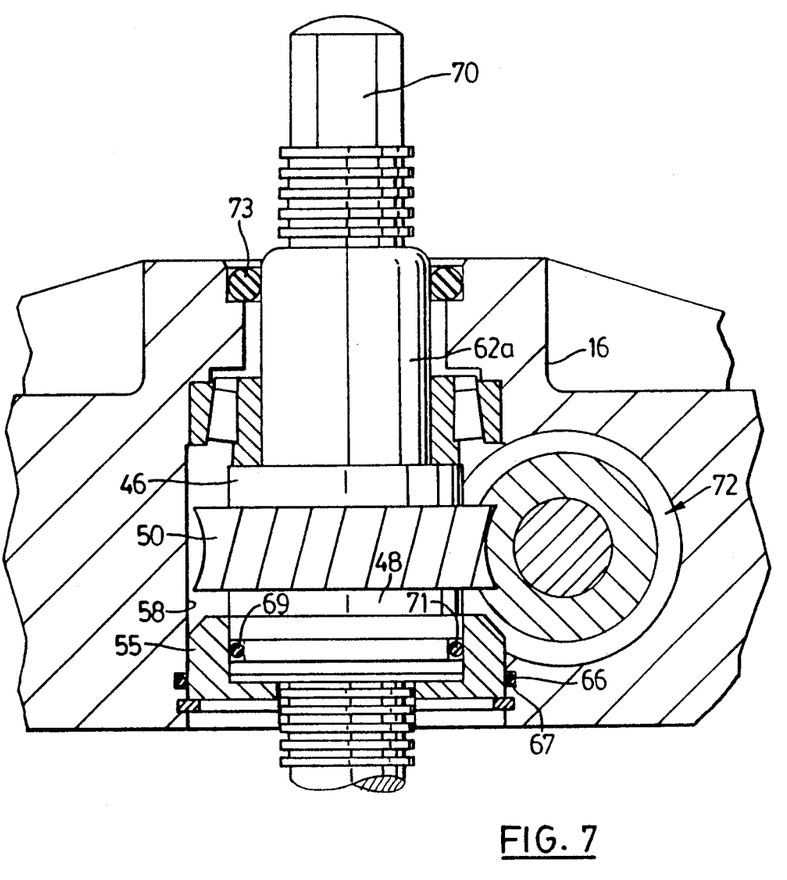
FIG. 7 is a partial vertical sectional view through the driving mechanism forming a part of this invention.
Figure 8:
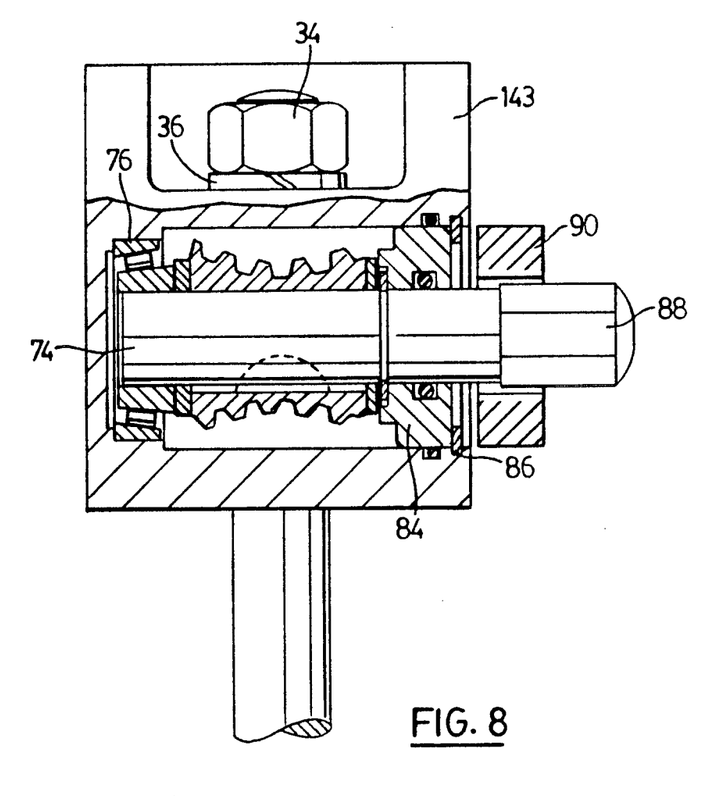
FIG. 8 is a further partial vertical sectional view through the driving mechanism.

Attention is now directed to FIG. 7, which is an enlarged view of the top portion of FIG. 1, showing the component 46. This figure clearly illustrates the provision of the exterior O-ring seal 66 located in a suitable annular gallery 67 machined into the top bar 16, and a further O-ring seal 69 located in an inward annular recess 71 machined into the bottom of the cylindrical sleeve 48.

FIG. 7 actually shows a slight variant, in which the collar 62a extends above the top surface of the top bar 16. An oil seal of conventional nature is illustrated at the numeral 73, fitting within a ledge machined into the top of top bar 16.

While several embodiments of this invention have been illustrated in the accompanying drawings and described hereinabove, it will be evident to those skilled in the art that changes and modifications may be made therein without departing from the essence of this invention, as set forth in the appended claims.

The embodiments of the invention in which an exclusive property or privilege is claimed are defined as follows:

1. A squeeze off tool for restricting fluid flow through a flexible pipe, the tool comprising:
   vise means which includes a first member adapted to be located underneath the pipe and a second member adapted to be located above the pipe,
   framework means operatively associated with said vise means, the framework means guiding the second member for movement toward and away from the first member,
   elongate power screw means defining an axis and having one end rotatably mounted to said second member while being restrained against axial movement with respect to said second member, and having external threads remote from said one end,
   lock means for selectively restraining rotation of said power screw means with respect to the second member, and
   mechanical advancement means mounted on said framework means and being operatively associated with said power screw means, the mechanical advancement means including:
   a) a sleeve member defining an internal thread engaging said external thread on said power screw means, the sleeve member being mounted for rotation with respect to the framework means but being restrained against axial movement with respect to said framework means,
   b) a worm gear mechanism including a worm gear adapted to rotate with said sleeve member and a worm engaging the worm gear, the worm being mounted on a worm shaft for rotation with respect to the framework means but being restrained against axial movement with respect to the framework means, and
   c) retaining means for selectively preventing rotation of the sleeve member with respect to the framework means,
   whereby rotation of the power screw means, while the sleeve member is prevented by said retaining means from rotating with respect to the framework means, moves the power screw means axially with respect to said sleeve means; and whereby rotation of the sleeve member, when the power screw means is restrained by said lock means against rotation with respect to the second member, also moves the power screw means axially with respect to said component.

2. The squeeze off tool claimed in claim 1, in which the mechanical advantage attained by rotating the sleeve member while the power screw means is restrained against rotation with respect to the second member is at least four times greater than the mechanical advantage attained by rotating the power screw means with the sleeve member stationary.

3. The squeeze off tool claimed in claim 1, in which said retaining means is a further lock means for positively restraining rotation of said worm gear mechanism with respect to said framework means.

4. The squeeze off tool claimed in claim 1, in which the framework means includes a top bar and two parallel, spaced-apart guide shafts secured to said top bar and extending through bores in said first and second members, said second member being slidable along said guide shafts, said first member having recess means allowing disengagement of the first member from one of said guide shafts to permit the squeeze off tool to be positioned around a flexible pipe.

5. The squeeze off tool claimed in claim 4, in which the end of the power screw means remote from said one end projects through said top bar, and has a hex configuration to permit engagement and rotation by a wrench.

6. The squeeze off tool claimed in claim 5, in which the mechanical advancement means is mounted to said top bar, and in which the retaining means is a further lock means for selectively positively retaining rotation of said worm gear mechanism with respect to said top bar, said further lock means including a slide plate mounted on said top bar and having a slot through which a faceted end of said worm shaft extends, the slot having a smaller width at one end and a greater width at the other end, the slide plate being mounted for movement between a) a first position in which said one end of the slot engages said faceted end and prevents said faceted end from rotating, and b) a second position in which said other end of the slot engages said faceted end and permits rotation of said faceted end.

7. The squeeze off tool claimed in claim 5, in which said lock means includes a diametral bore through said power screw means adjacent said one end, a locking pin adapted to pass through said diametral bore and project out from at least one end thereof, and securement means on said second member for engaging a projecting portion of said pin, thereby restraining rotation of the power screw means with respect to the second member.

8. The squeeze off tool claimed in claim 1, in which the second member supports, at either end, a gauge plate adapted to establish the closest approach of the second member to the first member by coming into contact with the first member.

9. The squeeze off tool claimed in claim 7, in which the second member supports, at either end, a gauge plate adapted to establish the closest approach of the second member to the first member by coming into contact with the first member.

10. A method for squeezing off a flexible pipe, thereby restricting fluid flow through the pipe, the method comprising the steps:
    a) providing a squeeze off tool which includes:
       vise means which includes a first member adapted to be located underneath the pipe and a second member adapted to be located above the pipe, framework means operatively associated with said vise means, the framework means guiding the second member for movement toward and away from the first member, elongate power screw means defining an axis and having one end rotatably mounted to said second member while being restrained against axial movement with respect to said second member, and having external threads remote from said one end, lock means for selectively restraining rotation of said power screw means with respect to the second member, and mechanical advancement means mounted on said framework means and being operatively associated with said power screw means, the mechanical advancement means including:

i) a sleeve member defining an internal thread engaging said external thread on said power screw means, the sleeve member being mounted for rotation with respect to the framework means but being restrained against axial movement with respect to said framework means, ii) a worm gear mechanism including a worm gear adapted to rotate with said sleeve member and a worm engaging the worm gear, the worm being mounted on a worm shaft for rotation with respect to the framework means but being restrained against axial movement with respect to the framework means, and iii) retaining means for selectively preventing rotation of the sleeve member with respect to the framework means, whereby rotation of the power screw means, while the sleeve member is prevented by said retaining means from rotating with respect to the framework means, moves the power screw means axially with respect to said sleeve means; and whereby rotation of the sleeve member, when the power screw means is restrained by said lock means against rotation with respect to the second member, also moves the power screw means axially with respect to said component, b) positioning the squeeze off tool with the first member below the pipe and the second member above the pipe, c) using the retaining means to keep said sleeve member stationary while rotating the power screw means, in order to advance the second member toward the first member and thereby initiate the squeezing off of said flexible pipe, d) using said worm gear mechanism to rotate said component while using said lock means to restrain the power screw means from rotating with respect to the second member, in order to continue to advance the second member toward the first member and thereby complete the squeezing off of said flexible pipe.

11. The method claimed in claim 10, in which the mechanical advantage attained in step d) is at least four times greater than the mechanical advantage attained in step c).

12. The method claimed in claim 10, in which the framework means provided in step a) includes a top bar and two parallel, spaced-apart guide shafts secured to said top bar and extending through bores in said first and second members, said second member being slidable along said guide shafts, and first member having recess means allowing disengagement of the first member from one of said guide shafts, and in which step b) includes the step of disengaging the first member from said one of said guide shafts, positioning the tool around the flexible pipe such that the pipe lies between the first and second members and between the two guide shafts, and then re-engaging said first member with said one of said guide shafts.

13. The method claimed in claim 12, in which the end of the power screw means remote from said one end projects through said top bar, and has a hex configuration to permit engagement and rotation by a wrench, and in which step c) is carried out by rotating the power screw means with a wrench engaging said hex configuration.

14. The method claimed in claim 3, in which the mechanical advancement means of the tool provided under step (a) is mounted to said top bar, and in which the retaining means is a further lock means for selectively positively restraining rotation of said worm gear mechanism with respect to said top bar, said further lock means including a slide plate mounted on said top bar and having a slot through which a faceted end of said worm shaft extends, the slot having a smaller width at one end and a greater width at the other end, the slide plate being mounted for movement between 1) a first position in which said one end of the slot engages said faceted end and prevents said faceted end from rotating, and 2) a second position in which said other end of the slot engages said faceted end and permits rotation of said faceted end, said step c) being carried out by first sliding the slide plate to said first position and then rotating the power screw means with said wrench, and said step d) being carried out by first sliding the slide plate to said second position and then rotating said worm shaft.

15. The method claimed in claim 13, in which said lock means provided under step a) as part of said tool includes a diametral bore through said power screw means adjacent said one end, a locking pin adapted to pass through said diametral bore and project out from at least one end thereof, and securement means on said second member for engaging a projecting portion of said pin, thereby restraining rotation of the power screw means with respect to the second member, and in which step d) is carried out by first passing said locking pin through said diametral bore and using said securement means to engage a projecting portion of said pin.

16. The method claimed in claim 10, in which the tool provided under step a) includes, at either end of the second member, a gauge plate adapted to establish the closest approach of the second member to the first member by coming into contact with the first member, and in which step d) terminates when contact occurs between the gauge plates and the first member.

17. The method claimed in claim 15, in which the tool provided under step a) includes, at either end of the second member, a gauge plate adapted to establish the closest approach of the second member to the first member by coming into contact with the first member, and in which step d) terminates when contact occurs between the gauge plates and the first member.

* * * * *